United States Patent Office 2,879,289
Patented Mar. 24, 1959

2,879,289

OXIDATION OF ALKYL BENZENES IN THE PRESENCE OF ALKANOLS

Winford B. Johnson, Wenonah, N.J., assignor to E. I. du Pont de Nemours and Company, Wilmington, Del., a corporation of Delaware No Drawing. Application June 27, 1956
Serial No. 594,101

9 Claims. (Cl. 260—475)

The present invention relates to the preparation of aromatic acid esters. More specifically, this invention relates to a one-step process for preparing esters of aromatic acids from aromatic compounds containing at least one alkyl group attached to the aromatic nucleus.

This application is a continuation-in-part of my co-pending application Serial No. 407,161, filed January 29, 1954, now abandoned.

In recent years, the esters of aromatic acids have become of considerable importance, particularly those which find use as intermediates in the manufacture of high polymers of the film- and fiber-forming types. Extensive research has been conducted to provide commercially suitable processes for preparing the esters, and, at the present time, a large number of methods are detailed in the published literature. In most processes, the ester is produced by first preparing the aromatic acid from the corresponding alkyl benzene, and thereafter esterifying the acid by reaction with the corresponding alkanol.

The preparation of dimethyl terephthalate may be cited as typical. U.S. Patent 2,636,899, issued April 28, 1953, discloses the oxidation of a dialkyl benzene (p-xylene) by dilute nitric acid at conditions of high temperature and high pressure. The product obtained is of good quality and can be esterified by the various methods known to the art to produce excellent dimethyl terephthalate. However, the nitric acid consumed during the oxidation of the alkyl groups represents a substantial proportion of the manufacturing cost of the terephthalic acid produced. In addition, the investment and space required for the necessary nitric acid-producing and -recovery equipment increases the over-all cost of a manufacturing plant.

The oxidation of alkyl benzenes by air has been investigated extensively and experimental studies have shown that air oxidation of one alkyl group can be accomplished with ease at relatively mild reaction conditions. The oxidation of additional alkyl groups, however, presents considerable difficulty. For example, when p-xylene is air oxidized at temperatures of about 125° C., commercially feasible yields of p-toluic acid are produced. In order to air oxidize the p-toluic acid thus formed to terephthalic acid, temperatures of 200° C. and over and high pressures are required to provide any substantial conversion. Due to the insolubility of terephthalic acid in the reaction mixture and the requirement of intense agitation, a conversion of about 30% to terephthalic acid is the maximum which can be attained without the development of an unmanageable slurry. Both oxidations result in the formation of considerable quantities of unwanted residues consisting of high-boiling complex material. In addition, operation at the higher temperature frequently results in the decomposition of the organic reactant into carbon dioxide, which decomposition results, of course, in yield losses.

In U.S. Patent 2,653,165, issued September 22, 1953, the oxidation of the methyl ester of p-toluic acid is described. According to the process described therein, p-xylene may be oxidized first to p-toluic acid by the conventional air-oxidation process, the p-toluic acid then is separated from the reaction mixture and esterified with methanol at an elevated temperature, and the ester then is oxidized by air to methyl hydrogen terephthalate. The latter may be hydrolyzed to produce terephthalic acid or esterified by methanol to produce dimethyl terephthalate.

Although the foregoing process eliminates the requirement of a costly oxidizing agent, the number of steps involved and the difficulties involved in the separation of the desired products from the undesirable residues produced during the oxidation steps are such that the process is not completely satisfactory from a commercial viewpoint.

It is, accordingly, an object of the present invention to provide a process for the direct preparation of esters of aromatic acids. A further object is to provide a process for the direct preparation of such esters in which air is used as the oxidizing means. Additional objects will become apparent as the present invention is more fully described.

I have found that the foregoing objects may be attained when I provide a process which comprises subjecting an aromatic compound containing at least one alkyl group attached to the aromatic nucleus to the combined action of an oxygen-containing gas and a lower-molecular-weight alkanol to produce in one step the corresponding carboalkoxy benzene. This conversion to ester is accomplished by introducing simultaneously the oxygen-containing gas and the alkanol into a reaction zone containing the alkyl benzene, the reaction zone being maintained at an elevated temperature and water being continuously removed from said reaction zone.

In order to describe more adequately the present invention, reference is now made to the following examples which are illustrative only, the invention not being limited to the specific embodiments set forth therein. Parts given in the examples are parts by weight unless otherwise designated.

*Example 1*

Twelve hundred parts of p-xylene, 7 parts of p-toluic acid, and 7.5 parts of a solution of cobalt naphthenate (6% cobalt by weight) were charged into an autoclave fitted with a condenser leading to a decanter and a pressure-regulating vent for release of noncondensable gases. The autoclave was pressurized to 600 p.s.i.g. with air, and the charge was heated to 350° F. Air under pressure then was introduced under the surface of the liquid charge, which was being thoroughly agitated, at the rate of 1.5 standard cubic feet per minute. When the temperature of the reaction mixture had risen to about 375° F., methanol was introduced simultaneously with the air feed for approximately 3 hours at a feed rate of about 25 parts per minute, a total of about 4400 parts of methanol being thus fed to the reaction zone, the temperature being held at about 375° F. throughout, and the pressure maintained at 600 p.s.i.g. Approximately 4389 parts of a mixture of p-xylene, methanol, and water was collected in the decanter during the run.

The product mixture (918 parts) was analyzed and found to contain 60% by weight of dimethyl terephthalate, 13.5% methyl p-toluate, 12.5% terephthalic acid, 4.0% methyl hydrogen terephthalate, and 2.2% p-toluic acid.

*Example 2*

The procedure described in Example 1 (identical charge and catalyst weights) was followed in the runs set forth in the table below, the runs illustrating the effect of temperature, pressure, time, and alcohol feed rate on the present process.

| Run | Temp. (° F.) | Pressure (p.s.i. g.) | Alcohol [1] (parts/ min.) | Time (hrs.) | Percent of Product | | | | |
|---|---|---|---|---|---|---|---|---|---|
| | | | | | DMT [2] | MPT [3] | TPA [4] | MHT [5] | PTA [6] |
| A | 375 | 600 | 25 | 3 | 60.0 | 13.5 | 12.5 | 4.0 | 2.2 |
| B [7] | 550 | 600 | [8] 48 | 2 | 35.5 | 35.5 | 0.17 | | |
| C | 500 | 600 | [8] 8 | 2 | 33.0 | 18.1 | | | [9] 30.6 |
| D | 475 | 250 | [8] 32 | 2 | 50.7 | 23.3 | 3.7 | 2.0 | 1.4 |
| E | 475 | 600 | [8] 48 | 2 | 15.0 | 56.3 | 1.5 | | |
| F | 475 | 600 | 17 | 1 | 12.0 | 31.4 | 16.6 | 8.0 | 20.8 |
| G | 475 | 600 | [8] 17 | 2 | 41.1 | 34.8 | 2.16 | 4.3 | 2.34 |
| H | 475 | 600 | 17 | 5 | 47.1 | 21.7 | 1.0 | | |

[1] Methanol.
[2] Dimethyl tetephthalate.
[3] Methyl p-toluate.
[4] Terephthalic acid.
[5] Methyl hydrogen terephthalate.
[6] p-Toluic acid.
[7] p-Toluic acid omitted from initial charge.
[8] Preheated methanol fed to the reactor.
[9] Total acids as PTA.

Example 3

A mixture of 1200 parts of p-xylene and 9 parts of a cobalt naphthenate solution (6% cobalt) was charged to an autoclave equipped as described in Example 1. After the charge was heated to 446° F. and a pressure of 400 p.s.i. ga. was attained, air at a rate of 1.5 standard cubic feet per minute and methanol at a rate of 32 parts per minute were introduced into the charge, the air and methanol feeds being continued for the duration of the run (5 hours). At the end of this time, the reactor was cooled and the product mixture withdrawn. The product mixture was analyzed and found to contain 83% dimethyl terephthalate.

Example 4

A mixture of 400 parts of p-xylene and 2 parts of the cobalt naphthenate catalyst was charged to an autoclave equipped with a decanter for removing the water of reaction. The autoclave was pressurized to 460 p.s.i. ga., and the charge was heated to a temperature of 428–465° F., the pressure and temperature being held at these levels throughout the run. Then, air at a rate of 0.7 standard cubic foot per minute and ethanol at a rate of about 9 parts per minute were introduced into the reactor, these feeds being continued for the duration of the run (1.75 hours). The total amount of ethanol fed was 948 parts. After completion of the run, the autoclave was cooled to room temperature and then vented, and the reaction mixture was withdrawn from the autoclave. The mixture was filtered to separate solid material, which subsequently was extracted with aqueous sodium carbonate solution to separate any acids present from solid esters. The decanter liquid and the filtrate was distilled to remove ethanol and unreacted p-xylene, and the residues were combined with p-xylene and extracted for 1 hour with aqueous sodium carbonate solution. The p-xylene layer was washed with sodium chloride and then distilled at atmospheric pressure to separate the esters. Ethyl p-toluate and diethyl terephthalate were obtained in 34% and about 3.4% yield, respectively.

Example 5 p-Xylene in the amount of 1200 parts and 8 parts of cobalt naphthenate solution (6% cobalt) were added to the reactor described in Example 1. The reactor was pressurized to 400 p.s.i. ga. with air, and then the charge was heated to 450° F. Isopropanol at a rate of 8 parts per minute and air at a rate of 1.5 standard cubic feet per minute were fed to the reactor for the duration of the run (3 hours), during which time the temperature was held at about 450° F. and the pressure at about 400 p.s.i.ga. The total amount of isopropanol fed was about 1380 parts. At the end of the reaction period, the reactor was cooled to 100° F. and then the product mixture was withdrawn. Analysis of the mixture (1230 parts) showed that the mixture contained 31% isopropyl p-toluate and 6% diisopropyl terephthalate.

Example 6

A mixture of 1200 parts of p-xylene and 7.5 parts of cobalt naphthenate solution (6% cobalt) was charged to the autoclave, which was pressurized to 450 p.s.iga. with air. The charge was heated to 450° F. Air at a rate of 1.5 standard cubic feet per minute and 1-propanol at a rate of 32 parts per minute were introduced simultaneously into the heated charge throughout the reaction period (4 hours). The temperature and pressure were held at about the initial levels throughout the run. A total of about 8060 parts of 1-propanol was fed. At the end of the run, the autoclave was cooled to 100° F., and the product mixture was removed and analyzed. The mixture (1764 parts) was shown by analysis to contain 24% n-propyl p-toluate and 13% di-n-propyl terephthalate.

Example 7

A mixture of 1200 parts of durene and 7.5 parts of cobalt naphthenate solution (6% cobalt) was charged to an autoclave equipped as described in Example 1. The autoclave was pressurized with air to 600 p.s.i.ga. and the charge heated to about 500° F., the pressure and temperature being held at about these levels for the duration of the run. Methanol at a rate of 32 parts per minute and air at a rate of 1.5 standard cubic feet per minute were introduced simultaneously into the heated mixture and fed for the duration of the run (6 hours). A total of about 10804 parts of methanol was fed. After completion of the run, the system was cooled slowly to 100° F., and the cooled product mixture was withdrawn from the autoclave. Analysis of the product mixture (1146 parts) showed that the mixture contained 14% methyl durylate (17% yield), 17% of a mixture of the dimethyl esters of 2,5-dimethylterephthalic acid and 4,6-dimethylisophthalic acid (17% yield), 25% trimethyl methyltrimellitate (20% yield), and 37% tetramethyl pyromellitate (26% yield). A 5% yield of acids (calculated as 2,5-dimethylterephthalic acid) was obtained.

Example 8

The procedure described in Example 7 was repeated, with the exception that the duration of the run was 3 hours, and the methanol feed rate was 24 parts per minute. The total methanol fed was about 3205 parts. The product mixture (1289 parts) was found, by analysis, to contain 40% methyl durylate (42% yield), 38% of a mixture of dimethyl esters of 2,5-dimethylterephthalic acid and 4,6-dimethylisophthalic acid (32% yield), and no tri- or tetraester. A 14% yield of acids (calculated as 2,5-dimethylterephthalic acid) was obtained.

Example 9

Eight hundred parts of durene containing 5 parts of cobalt naphthenate solution (6% cobalt) was charged to the autoclave, which was pressurized with air to 600 p.s.i.ga. After the charge was heated to 500° F., the air and methanol feeds were introduced simultaneously into the charge at rates of 1.5 standard cubic feet per minute and 32 parts per minute respectively. The temperature of about 500° F. and pressure of about 600 p.s.i.g. were maintained throughout the duration of the run (3 hours). During this time a total of about 4773 parts of methanol was fed. After the system was cooled to 100° F., the product mixture (796 parts) was removed from the autoclave and analyzed. The analysis showed that the mixture contained 22% methyl durylate (26% yield), 27% of a mixture of the dimethyl esters of 2,5-dimethylterephthalic acid and 4,6-dimethylisophthalic acid (25% yield), 13% trimethyl methyltrimellitate (10% yield, and 24% tetramethyl pyromellitate (16% yield). A 10% yield of acids (calculated as 2,5-dimethylterephthalic acid) was obtained.

*Example 10*

The procedure of Example 9 was repeated, with the exception that the charge comprised 1200 parts of durene and 7.5 parts of cobalt naphthenate solution (6% cobalt) and the air feed rate was 0.5 part per minute. The total amount of methanol fed was about 5583 parts. The product mixture (1305 parts) contained, as shown by analysis, 25% methyl durylate (29% yield), 34% of a mixture of the dimethyl esters of 2,5-dimethylterephthalic acid and 4,6-dimethylisophthalic acid (32% yield), 4% trimethyl methyltrimellitate (3% yield), and 9% tetramethyl pyromellitate (6% yield). A 12% yield of acids (calculated as 2,5-dimethylterephthalic acid) was obtained.

*Example 11*

The procedure of Example 9 again was repeated, with the exception that the charge comprised 1200 parts of durene and 7.5 parts of the cobalt catalyst, the reaction temperature was held at about 550° F., and the reaction time was 2 hours. A total of about 4555 parts of methanol was fed to the reactor. The product mixture (1330 parts) thus obtained was determined by analysis to contain 43% methyl durylate (44% yield), 28% of a mixture of the dimethyl esters of 2,5-dimethylterephthalic acid and 4,6-dimethylisophthalic acid (22% yield), 4% trimethyl methyltrimellitate (3% yield), and 11% tetramethyl pyromellitate (6% yield). A 12% yield of acids (calculated as 2,5-dimethylterephthalic acid) was obtained.

*Example 12*

In several runs, various hydrocarbons were subjected to simultaneous treatment with air and methanol according to the procedure set forth in Example 4. A summary of the reaction conditions and the results obtained in these runs is given in the following table:

| Run No. | Hydrocarbon (parts) | Cobalt Naphthenate Catalyst (parts) | Temp. Range (° F.) | Air Feed Rate (std. c.f.m.) | MeOH Feed Rate (parts/min.) | Total MeOH Fed (parts) | Reaction Time (hrs.) | Percent Yield | |
|---|---|---|---|---|---|---|---|---|---|
| | | | | | | | | Monoester | Diester |
| A' | Toluene, 200 | 1 | 446–482 | 0.3–0.4 | 4 | 416 | 1.75 | 35 | |
| B' | Ethylbenzene, 200 | 1 | 464–518 | 0.3–0.4 | 4 | 408 | 1.75 | 39 | |
| C' | o-Xylene, 400 | 2 | 410–464 | 0.7–0.8 | 8 | 797 | 1.75 | 25 | 8 |
| D' | m-Xylene, 400 | 2 | 428–464 | 0.7–0.8 | 7 | 824 | 2 | 50 | 6 |
| E' | Cumene, 400 | 2 | 437–473 | 0.7–0.8 | 7 | 740 | 1.75 | 25 | |

*Example 13*

A mixture of 1200 parts of methyl p-toluate and 9 parts of cobalt naphthenate solution (6% cobalt) was charged to the autoclave, which then was pressurized to 600 p.s.i.g. The charge was heated to about 500° F., and then methanol and air were introduced simultaneously into the heated charge. The temperature and pressure were held at about the initial levels for the duration of the run (2 hours) during which time a total of about 1896 parts of methanol and 300 standard cubic feet of air were introduced. At the end of the reaction period, the autoclave was cooled to 100° F. and then vented. The product mixture was withdrawn. The mixture (916 parts) was shown by analysis to contain 78.3% dimethyl terephthalate, 10% methyl p-toluate, and 2.4% acids (calculated as p-toluic acid).

*Example 14*

A heel consisting of 1500 parts of a p-xylene-methanol mixture was charged to a column reactor having pressure-controlling means and equipped for continuous operation. The reactor was pressurized with nitrogen to 385–400 p.s.i.g., and the heel was heated to 590° F. Then, air at a rate of 0.3 standard cubic foot per minute and a 2/1 (by wt.) mixture of methyl p-toluate and methanol at a rate of about 9 parts per minute were introduced into the reactor. The methyl p-toluate-methanol feed contained 100 p.p.m. of the cobalt naphthenate catalyst (based upon the weight of the methyl p-toluate). For the duration of the run (ca. 29 hours), these feeds were continued and the temperature and pressure were maintained at about the initial levels. The total retention time (based on holdup) was 4 hours. At the completion of the run, the feeds were stopped and the product receiver was drained to a hold tank equipped with a condenser. Analysis of the product mixture showed the mixture to contain 44% dimethyl terephthalate, 26% methyl p-toluate, and 16% acids (calculated as p-toluic acid).

*Example 15*

To the continuous reactor described in Example 14 was charged a mixture of about 3200 parts of p-xylene containing 100 p.p.m. of the cobalt catalyst. After the mixture was heated to 482° F. and a pressure of 1000 p.s.i.g. was attained, air at a rate of 7.0 standard cubic feet per minute was introduced into the reactor. After the reaction was initiated, a mixture of methanol and p-xylene in 4/1 mole ratio and containing 100 p.p.m. of the cobalt catalyst (based on the weight of the p-xylene) was fed to the reactor at a rate of 255 parts per minute. The air feed and the p-xylene-methanol feed were continued for the duration of the run. Analysis of the liquid reaction mass indicated that 7.5% by weight of methanol was present in the liquid. After 4.75 hours, the reaction mixture was sampled, and the sample was analyzed and found to contain 22% dimethyl terephthalate and 8% methyl p-toluate.

*Example 16*

About 4000 parts of methyl p-toluate containing 100 p.p.m. of the cobalt catalyst was charged to the continuous reactor. When the reaction temperature of 527° F. and the reaction pressure of 1000 p.s.i.g. were attained, the air feed to the reactor was started. Upon initiation of the reaction, a mixture of methanol and methyl p-toluate in a 4/1 mole ratio was fed to the reactor at a rate of about 98 parts per minute. The methanol-methyl p-toluate feed and the air feed (2.7 standard cubic feet per minute) were maintained throughout the course of the run. The methanol concentration in the liquid reaction mixture was 3.7% by weight. After 3.75 hours, the liquid reaction mass was sampled and shown by analysis to contain 25.5% dimethyl terephthalate.

Example 17

The procedure of Example 16 was repeated with the exception that the reaction temperature and pressure were 482° F. and 600 p.s.i.g., the air feed rate was 3.4 standard cubic feet per minute, and the methanol-methyl p-toluate mixture (2/1 mole ratio) was fed to the reactor at the rate of about 164 parts per minute. The concentration of methanol in the liquid reaction mass was 0.6% by weight, and the retention time was 15 minutes. Analysis of a sample of the reaction mixture taken 3.5 hours after start of the organic feed showed that the dimethyl terephthalate content was 14.4%.

The foregoing examples illustrate the excellent results obtained by effecting the formation of the carboalkoxy benzenes in one step instead of in a number of steps as has been done previously. For instance, many of the multistep processess of the prior art are characterized by the formation of substantial quantities of undesirable residues consisting of complex high-boiling materials. In contradistinction to many of these multi-step processes, minimum amounts of undesirable residues are formed in the one-step process of the present invention. Moreover, in carrying out the processes of the prior art, separate equipment is required for the various steps, and additional equipment is required to effect the separations necessary between the various steps. Following the procedure of the present invention, only one reactor is required and the reaction is carried out in a single step.

The process of the present invention provides superior thermal self-sufficiency in that the requirement for heat removal associated with oxidation and heat supply associated with esterification when oxidation and esterification are conducted separately is eliminated. Product handling is facilitated by the process of the present invention, because most esters are molten at the reaction conditions and the concentrations of the insoluble acids are held at low values. Thus, in addition to reduced equipment requirements, greater simplicity of design and operation is achieved by the present process. Moreover, the fluidity of the reaction mass increases the intimacy of contact of the reactants to promote production of the desired products.

Furthermore, a significant manifestation of the fundamental advantages inherent in the process of the present invention is found in the observation that the addition of an alkanol to the reaction system simultaneously with the addition of an oxygen-containing gas effects beneficial results in that the amount of the alkyl benzene converted to carbon dioxide is decreased. This manifestation may be seen by an examination of the following data. In a series of runs conducted according to the procedure of Example 1, the rate of addition of the alkanol, in this case methanol, to the reaction zone was varied among runs, whereas all the other reaction conditions were held constant. In all the runs, the initial charge comprised 1200 parts of p-xylene containing 9 parts of the cobalt catalyst and the operating conditions were: temperature, 437° F.; pressure, 400 p.s.i.g.; air feed rate, 1.5 standard cubic feet per minute; and time, 2 hours. The methanol feed rate and the yield loss incurred by the conversion of p-xylene to carbon dioxide are summarized in the following table.

| Run | MeOH Feed Rate (parts/min.) | Conversion of p-Xylene to $CO_2$ (percent) |
| --- | --- | --- |
| I | 0 | 6 |
| II | 16 | 4.5 |
| III | 32 | 2 |

As previously mentioned, the formation of carbon dioxide clearly represents a yield loss, and the unexpected beneficial effect of the presence of the alkanol in the reaction mass, which effect apparently is proportional to the rate at which the alkanol is supplied, is a commercially important feature of my invention. In the previously known applications of the oxidation of alkyl benzenes by oxygen-containing gases, yield losses to carbon dioxide were reduced by operating, when possible, at relatively low temperatures. Although the low-temperature operation resulted in the desired reduction in the formation of carbon dioxide, this method of operating was unsatisfactory in that inordinately long reaction periods were required. My discovery that the conversion of alkyl benzenes to carbon dioxide can be controlled by providing an alkanol in the reaction zone allows preparation of carboalkoxy benzenes at relatively high temperatures without excessive conversion to carbon dioxide and thus eliminates some of the inadequacies of previously known methods for the preparation of the carboalkoxy compounds.

An essential feature of the present process is the removal of water from the reaction zone to promote the production of esters. In the examples, the water was removed by eliminating reflux from the condenser and leading all condensed vapors to a decanter. By conventional means, arrangements can be made for separating the water from the condensed vapors and returning the unreacted alkyl benzene and alkanol to the reaction zone.

As has been illustrated in the examples, the process is applicable not only to such starting materials as monoalkyl-substituted benzenes, such as toluene, ethylbenzene, and cumene, polyalkyl-substituted benzenes, such as o-, m-, and p-xylene and durene, but also to partially oxidized and esterified derivatives of said benzenes, such as methyl p-toluate, and mixtures of these compounds, such as p-xylene and methyl p-toluate. In general, the process is applicable to aromatic compounds having at least one alkyl group having from 1 to 3 carbon atoms attached to the aromatic nucleus. In addition to the afore-mentioned compounds, such compounds include monoalkyl benzenes such as propylbenzene, polyalkyl benzenes such as cymene and the isomers of trimethylbenzene (hemimellitene, pseudocumene, and mesitylene), partially oxidized derivatives of said polyalkyl benzenes such as p-methylbenzyl alcohol, tolualdehyde, toluic acid, toluic anhydride, durylic acid, 2,5-dimethylterephthalic acid, 4,6-dimethylisophthalic acid, and methyltrimellitic acid, and esters of said partially oxidized derivatives such as methyl durylate, the dimethyl esters of 2,5-dimethylterephthalic acid and 4,6-dimethylisophthalic acid and trimethyl methyltrimellitate. The term "alkyl benzene" as used herein includes not only mono- and polyalkyl benzenes but also partially oxidized derivatives of polyalkyl benzenes, esters and ethers of partially oxidized derivatives of polyalkyl benzenes, and mixtures of these compounds.

Lower-molecular-weight alkanols suitable for use in the present process include those alkanols containing 1 to 3 carbon atoms, i. e., methanol, ethanol, 1-propanol and isopropanol. The alkanol is fed at a rate such that the concentration of alkanol in the liquid reaction mass is at least about 0.5% by weight or about 2.5% on a molar basis. Feeding the alkanol at a greater rate is not deleterious to the process of the present invention, since the operating conditions are such that any excess is removed rapidly from the reaction zone.

The process of the present invention normally will be carried out at elevated temperatures, for example at temperatures above 250° F. By proper regulation of the air and alkanol feed rates, the temperature in the reaction zone can be maintained at the desired level. The process of the present invention may be carried out at temperatures within the range of 250-750° F. The use of temperatures below 250° F. is feasible but impractical because of the induction period and slow rates of reaction thereby encountered, whereas the use of temperatures above 750° F. is feasible but impractical because of degradation of the products thereby incurred. Temperatures within the range of 300 and 600° F. have been found to be especially effective and therefore are preferred.

In addition, the process of the present invention normally will be carried out at superatmospheric pressures, for example at pressures above 10 atmospheres. In general, pressures within the range of 10 and 1000 atmospheres may be used in effecting the present process. The use of lower pressures may cause losses of low-boiling reactants by vaporization, whereas the use of extremely high pressures requires the use of complicated and expensive equipment. The use of pressures within the range of 250–1500 p.s.i.g. has been found to give very good results, and therefore pressures within the range are preferred.

The use of a catalyst is not a critical feature of the process of the present invention, although the presence of a catalyst promotes initiation of the reaction. The use of cobalt naphthenate as the catalyst has been exemplified; however, in general, if the presence of a catalyst in the reaction mass is desired, any of the oxidation catalysts conventionally used in the oxidation of alkyl benzenes may be employed. These catalysts include oxides, hydroxides, and inorganic and organic acid salts of cobalt, manganese, cerium, vanadium, lead, chromium, and iron. Of the organic acid salts of these metals, the toluates, naphthenates, and stearates are especially suitable for use in this process. The catalyst preferably is soluble or partially soluble in the reaction mixture.

Although I do not wish to be limited by a theoretical discussion of the reactions involved in the process of the present invention, an interrelationship appears to exist among the five reaction variables: temperature, pressure, air feed rate, alkanol feed rate, and time. This interrelationship and the effect of this interrelationship upon the composition of the product mixture may be seen by reference to the examples, especially Examples 7–11 which pertain to the production of esters from durene. A comparison of Examples 9 and 10 indicates that at a lower air feed rate the product mixture contains a preponderance of mono- and diesters, although the total yield of esters is approximately the same in both runs. A comparison of Examples 8 and 9 indicates that at a lower alkanol feed rate the product mixture contains a preponderance of mono- and diesters and a slightly larger amount of acids, although the total yield of esters is approximately the same in both runs. A comparison of Examples 7 and 11 indicates that use of a shorter reaction period again results in the formation of larger amounts of the mono- and diesters than the tri- and tetraesters without a substantial decrease in the overall yield of esters. Therefore, it is evident that the desired composition of the reaction product may be obtained by proper regulation of these five reaction variables.

The examples have set forth the use of air as the oxygen-containing gas. However, as is evident, molecular oxygen or ozone or mixtures of these gases with inert gaseous diluents, such as nitrogen, carbon dioxide, or the like, may be substituted for the air.

The desired esters may be separated from the reaction mixture by conventional means. For example, for plant production of dimethyl terephthalate by the present process, the dimethyl terephthalate would be removed from the product by distillation or crystallization, and the remainder of the product returned with fresh p-xylene to the reactor for further conversion to dimethyl terephthalate. The mixture in the decanter is recovered easily by simple distillation to strip off the methanol and stratification to remove the water from the p-xylene, both the methanol and p-xylene being returned to the process.

Examples 14–17 illustrate the process of the present invention as carried out in a continuous manner. As may be seen, only slight modification is required to operate the process in a continuous manner.

The invention has been described in detail in the foregoing. It will be apparent to those skilled in the art that many variations are possible without departure from the scope of the invention. I intend, therefore, to be limited only by the following claims.

I claim:

1. A process for the preparation of alkyl esters of benzene carboxylic acids which comprises introducing an oxygen-containing gas simultaneously with a 1–3 carbon alkanol into a reaction zone containing an alkyl benzene, said reaction zone being maintained at a temperature between 250° F. and 750° F. and a pressure between 10 and 1000 atmospheres, said alkanol being introduced at such rate as to maintain an alkanol concentration in the reaction zone of at least 0.5% by weight.

2. A process as claimed in claim 1, wherein an oxidation catalyst is present in the reaction zone.

3. A process for the preparation of dimethyl terephthalate which comprises introducing air simultaneously with methanol into a reaction zone containing p-xylene, said reaction zone being maintained at a temperature between 300° and 600° F. and at a pressure of from 10 to 1000 atmospheres, said methanol being introduced at such rate as to maintain a methanol concentration within the reaction zone of at least 0.5% by weight.

4. Process according to claim 1, wherein the alkyl benzene is toluene.

5. Process according to claim 1, wherein the alkyl benzene is ethylbenzene.

6. Process according to claim 1, wherein the alkyl benzene is cumene.

7. Process according to claim 1, wherein the alkyl benzene is xylene.

8. Process according to claim 1, wherein the alkyl benzene is durene.

9. Process according to claim 1, wherein the alkyl benzene is methyl p-toluate.

References Cited in the file of this patent

UNITED STATES PATENTS

| | | |
|---|---|---|
| 2,569,440 | Agnew et al. | Oct. 2, 1951 |
| 2,653,165 | Levine | Sept. 22, 1953 |

FOREIGN PATENTS

| | | |
|---|---|---|
| 623,836 | Great Britain | May 24, 1949 |

UNITED STATES PATENT OFFICE

CERTIFICATE OF CORRECTION

Patent No. 2,879,289                            March 24, 1959

Winford B. Johnson

It is hereby certified that error appears in the printed specification of the above numbered patent requiring correction and that the said Letters Patent should read as corrected below.

Column 3, line 2 below the table, for "tetephthalate" read -- terephthalate --; line 51, for "was" read -- were --; column 5, line 14, for "(10% yield," read -- (10% yield), --.

Signed and sealed this 11th day of August 1959.

(SEALED)
Attest:

KARL H. AXLINE                                      ROBERT C. WATSON
Attesting Officer                                   Commissioner of Patents